L. P. RIDER & W. H. SHILLITO.
Relief-Valve for Air and Steam Brake Cylinders.
No. 160,715.  Patented March 9, 1875.
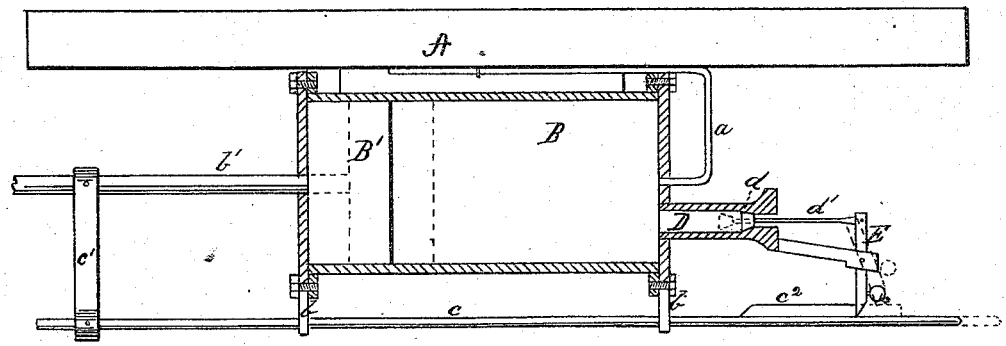
WITNESSES
James B. Kay
L. C. Fitter.
INVENTORS
Leman P. Rider
William H. Shillito
by Bakewell & Kerr
Attys.

UNITED STATES PATENT OFFICE.

LEMAN P. RIDER AND WILLIAM H. SHILLITO, OF PITTSBURG, PA.

IMPROVEMENT IN RELIEF-VALVES FOR AIR AND STEAM BRAKE CYLINDERS.

Specification forming part of Letters Patent No. 160,715, dated March 9, 1875; application filed January 26, 1875.

*To all whom it may concern:*

Be it known that we, LEMAN P. RIDER and WILLIAM H. SHILLITO, of Pittsburg, in the county of Allegheny and State of Pennsylvania, have invented a new and useful Improvement in Relief-Valves for Air and Steam Brake Cylinders; and we do hereby declare the following to be a full, clear, and exact description thereof, reference being had to the accompanying drawing forming a part of this specification, in which the figure is a sectional view of a brake-cylinder and its attachments embodying our invention.

Our invention relates to the relief-valves of brake-cylinders; and it consists in combining with the brake-cylinder a valve operated from the piston-rod, through a positive connection, whereby the first part of the return movement of the piston is utilized for the purpose of opening, and holding open, a valve, until the pressure within the brake-cylinder is reduced to or near atmospheric pressure.

In the application of air and steam brakes each car is provided with a brake-cylinder, which is supplied with compressed air or steam through a branch pipe leading to the main pipe, which runs the length of the train. The compressed air is admitted to one side of the piston, and operates, through the piston, its stem, and the brake-lever, to apply the brakes. When the brakes are to be let off the compressed air or steam in rear of the piston is allowed to escape, or is exhausted from some point outside of the brake-cylinder, generally along the line of the main induction-pipe; and to facilitate the reduction of the pressure automatic valves have been introduced into the branch pipes at and near the brake-cylinder. The pressure being removed, the brakes are withdrawn by strong springs. By these means of letting off the brakes the escape of the compressed air from the brake-cylinder is so gradual, and so long a time elapses before the power of the springs is sufficient to overcome the resistance of the compressed air in the cylinder to withdraw the brakes, that often, when a train is started quickly after the brakes have been applied, the shoe will hug the wheel for a considerable length of time, retarding the train, and causing loss from wear and tear upon the shoe and brake mechanism.

The object of the present invention is to overcome these objections to the use of the air and steam brake by supplying a means for producing a positive escape for the compressed air in rear of the piston, whereby the piston is instantly released, and the brakes can respond to the action of the springs.

We will now proceed to describe our invention, so that a person skilled in the art may apply the same.

A represents the bottom of a car, to which is attached a brake-cylinder, B, provided with a piston, B', and piston-rod $b'$, compressed air being admitted to the cylinder in rear of piston B' through a branch pipe, $a$. On the heads of cylinder B are lugs or projections $b$, which serve as guides and supports for a rod, $c$, or similar device, which is shown in the drawing as rigidly connected to the piston-rod $b'$ by an arm, $c^1$, but which may be connected to the brake-lever or any of the intermediate mechanism, if deemed desirable. By reason of this connection the rod $c$ must move in unison with the brake mechanism. To one head of the brake-cylinder is secured a valve-chamber, D, provided with a valve, $d$, the stem $d'$ of which is connected with a pivoted weighted lever, E, the free end of said lever being in the travel of the rod $c$, and operated by a cam, $c^2$, on the rod.

The operation of these devices is as follows: The brakes being applied by admitting compressed air to the rear of the piston, the parts will occupy the relative position shown in full lines. Now, when the brakes are to be let off the engineer will proceed, as usual, to permit the escape of the compressed air, or cause the exhaust at a point outside of the brake-cylinder, generally in the main induction-pipe, which will permit the piston to retreat slightly. This slight motion of the piston and of the brakes is not enough to take off the brakes, but being communicated to the rod $c$ the retreat of the rod causes the cam thereon to force back the free end of lever E, which, acting on the valve-stem, opens the valve $d$, permitting the free escape of the compressed air from the rear of the piston, so that all resistance to the action of the springs is removed, and the brakes are instantly withdrawn. The length of the cam on rod *c* will determine the length of time the valve is held open, and the bevel *e* on the inner edge will permit the rod to move forward without operating the valve in any other respect than to force it down upon its seat.

The valve and valve-seat may be faced in any of the usual ways, and, instead of weighting the lever, a spring may be used to seat the valve.

Having thus described our invention, what we claim as our invention, and desire to secure by Letters Patent, is—

1. In combination with the brake-cylinder, a valve operated from the piston-rod through suitable intermediate mechanism, that will cause the first part of the return stroke of the piston to open the valve and allow of a free escape of the compressed air, substantially as specified.

2. In combination with the brake-cylinder, the valve *d*, weighted lever E, and cam-rod *c*, the cam-rod being relatively connected to the piston-rod, substantially as and for the purpose specified.

In testimony whereof we, the said LEMAN P. RIDER and WILLIAM H. SHILLITO, have hereunto set our hands.

LEMAN P. RIDER.
WILLIAM H. SHILLITO.

Witnesses:
F. W. RITTER, Jr.,
T. B. KERR.